A. L. POESSEL.
FLOWER BOX AND THE LIKE.
APPLICATION FILED OCT. 30, 1913.
1,132,210.
Patented Mar. 16, 1915.
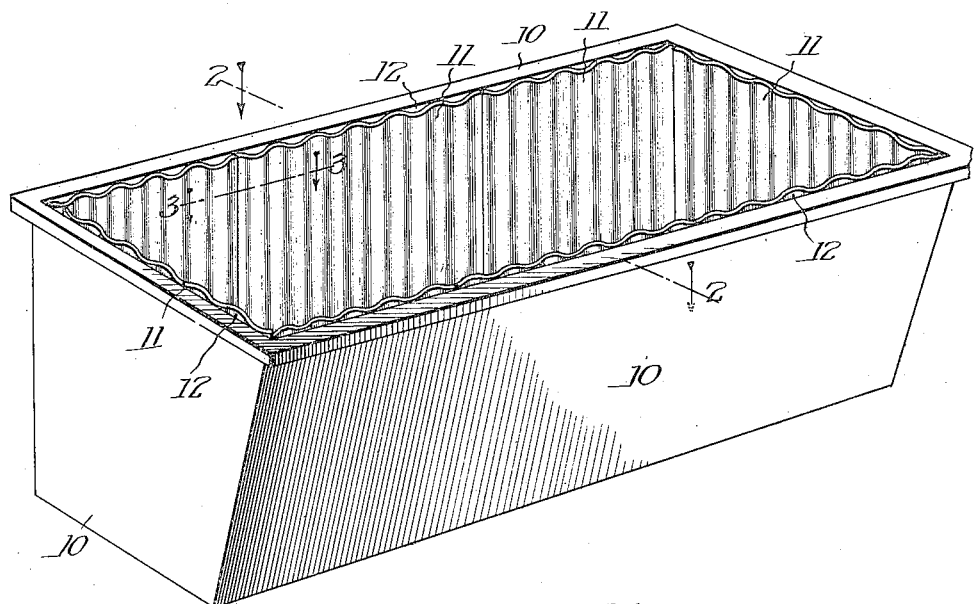
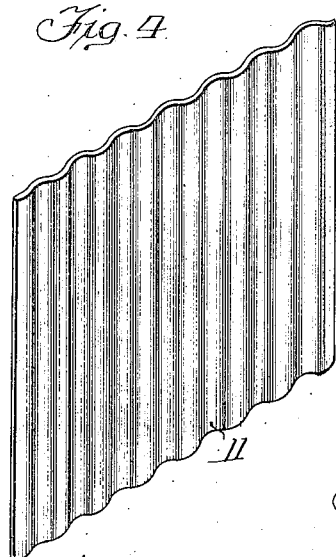
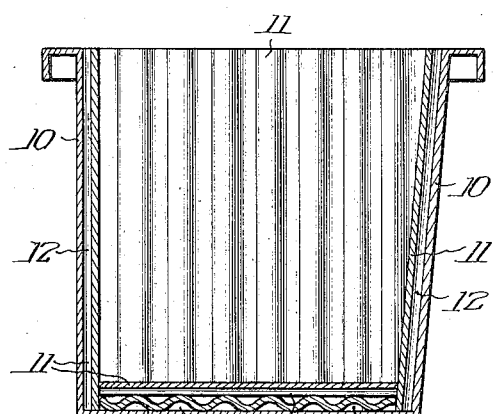
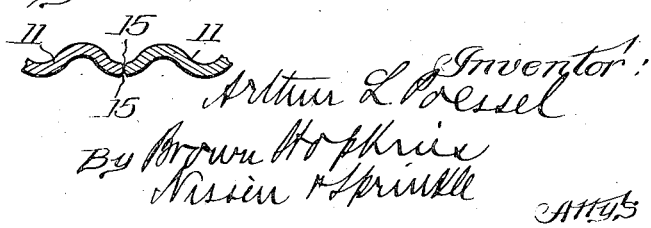
Witnesses:
W. P. Kilroy
Chas. Koursh
Inventor:
Arthur L. Poessel
By Brown, Hopkins, Nissen & Sprinkle
Attys

UNITED STATES PATENT OFFICE.

ARTHUR L. POESSEL, OF CHICAGO, ILLINOIS.

FLOWER-BOX AND THE LIKE.

1,132,210.

Specification of Letters Patent.

Patented Mar. 16, 1915.

Application filed October 30, 1913. Serial No. 798,182.

*To all whom it may concern:*

Be it known that I, ARTHUR L. POESSEL, a citizen of the United States, residing at Chicago, in the county of Cook and State of Illinois, have invented certain new and useful Improvements in Flower-Boxes and the like, of which the following is a specification.

My invention relates to flower boxes and the like and has for its primary object the provision of an improved device of that character which shall have improved means for aerating the soil about the roots of plants contained in such boxes.

With the above and other objects in view this invention consists substantially in the combination, arrangement and construction of parts all as hereinafter described, shown in the accompanying drawing which form a part of this specification and illustrate the preferred embodiment of my invention, and more particularly pointed out in the subjoined claims.

In the drawings, Figure 1 is a view in perspective of a flower box embodying my invention; Fig. 2 is a vertical section thereof taken on the line 2—2 of Fig. 1 and looking in the direction indicated by the arrows; Fig. 3 is a horizontal section taken on the line 3—3 of Fig. 1 and looking in the direction indicated by the arrows; and Fig. 4 is a view in perspective of a corrugated plate forming a portion of my invention.

In the drawings, reference numeral 10 indicates a flower box or the like adapted to contain soil and growing plants therein. A series of corrugated plates 11 are placed within the box 10 and form a lining therefor; the plates being disposed in the box in such a manner that the corrugations thereof have passages for air from the upper edge of the box to a point adjacent the bottom thereof; two of these vertical passages for air being indicated at 12 in Figs. 1 and 2. The bottom of the box 10 is lined with crossed corrugated plates 11 making both longitudinal air passages 13 and lateral air passages 14 for the bottom of the box. The plates 11 may be formed of any desired material but are preferably made of porous baked clay. In the construction of the plates 11 they terminate at each end preferably at the apex of one of the corrugations, and the contacting edges of the ends are very slightly rounded as at 15 (see Fig. 3) to facilitate their even contact. The object in terminating the plates at the apex of one of the corrugations is for the purpose of causing adjacent edges of the plates to lie opposite each other when they are placed end to end.

By the use of my invention the excessive acidity or sourness of soil used in flower boxes and the like is obviated by reason of the aeration of the soil permitted by the passageways 12, 13 and 14 and the porous character of the corrugated lining plates 11. The aeration of the soil is assisted by the slow evaporation of moisture in the soil through the porous plates 11, the water evaporated being replaced by air drawn into the soil thus sweetening the soil because of the added oxygen introduced therein.

In the accompanying drawings and in the foregoing description is set forth the preferred embodiment of my invention but it is obvious that one skilled in the art may make modifications thereof without departing from the spirit of the invention.

I claim:

1. The combination with a receptacle for soil and growing plants, of a removable lining for the sides and bottom consisting of separately removable corrugated plates, with the corrugations forming air space between the receptacle and all of the plates.

2. The combination of a receptacle for soil and growing plants, of a number of flat corrugated plates forming a lining for the sides and for the bottom of the receptacle, the sides being separately removable and the bottom being independently removable from any of the sides, the corrugations forming an air space between each of the plates and the sides and bottom of the receptacle.

3. A lining for flower boxes comprising a plurality of removable channeled plates adapted to be placed about the sides and upon the bottom of the interior of the flower boxes and with the channels between the plates and the flower box forming spaces between the plates and the bottom and sides of the flower boxes.

4. The combination with a receptacle for soil and growing plants, of a series of corrugated plates forming a lining for said receptacle, each of said plates terminating at the apex of one of said corrugations, and said lining forming with the receptacle a plurality of air passages about the sides and bottom of the interior of the receptacle.

5. The combination with a receptacle for soil and growing plants, of a lining therefor comprising corrugated plates each terminating at the apices of corrugations lying in the same plane, the end edges of said plates being slightly rounded and the plates forming, together with the receptacle, a plurality of passage-ways for air about the sides and bottom of the interior of the receptacle.

6. The combination with a receptacle for soil and growing plants, of a lining therefor forming with the receptacle a plurality of air passages about the sides and bottom of the interior of the receptacle, said lining comprising a single layer of porous corrugated plates about the sides of the receptacle, the corrugations thereof being approximately vertical, and a double layer of crossed porous corrugated plates covering the bottom of the interior of the receptacle.

In testimony whereof I have signed my name to this specification, in the presence of two subscribing witnesses, on this 27th day of October, A. D. 1913.

ARTHUR L. POESSEL.

Witnesses:
CHARLES H. SEEM,
KATHERINE O'NEILL.